Patented July 9, 1940

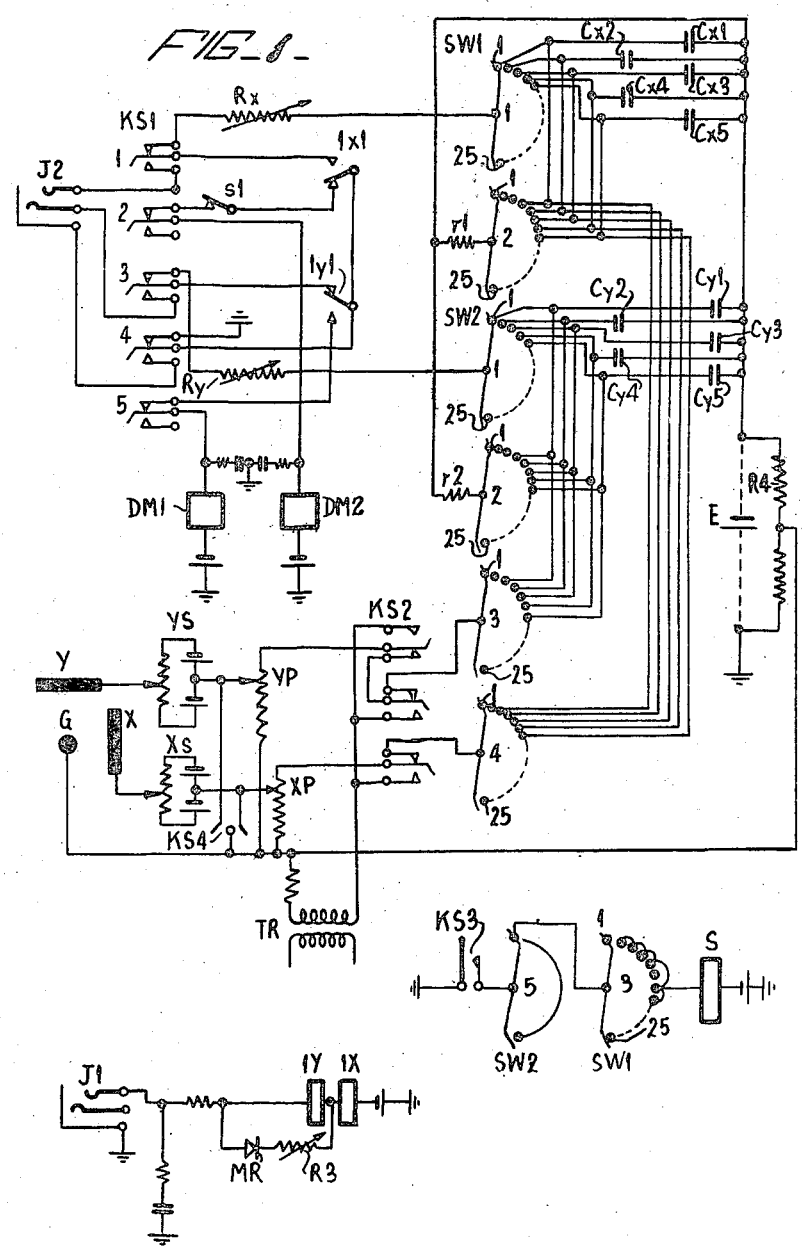

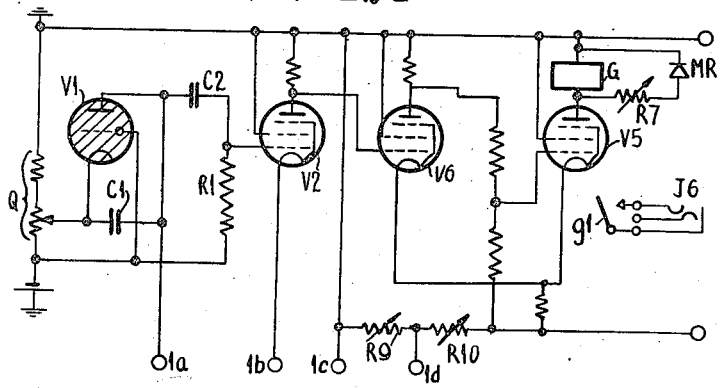
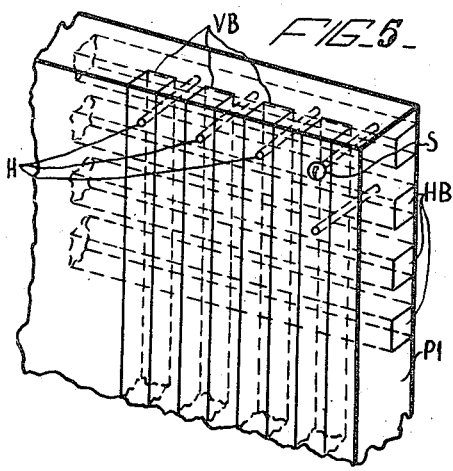
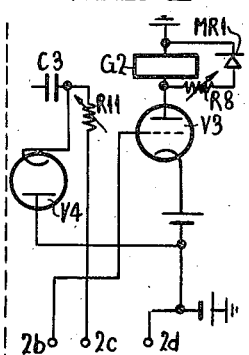
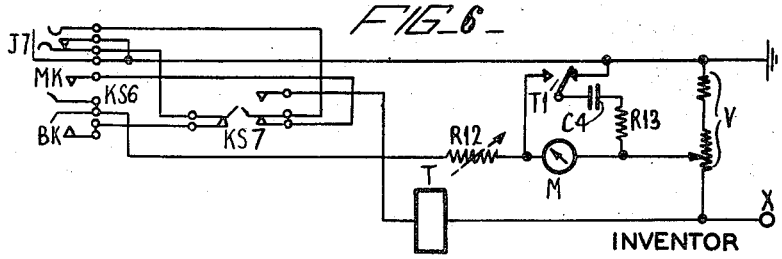

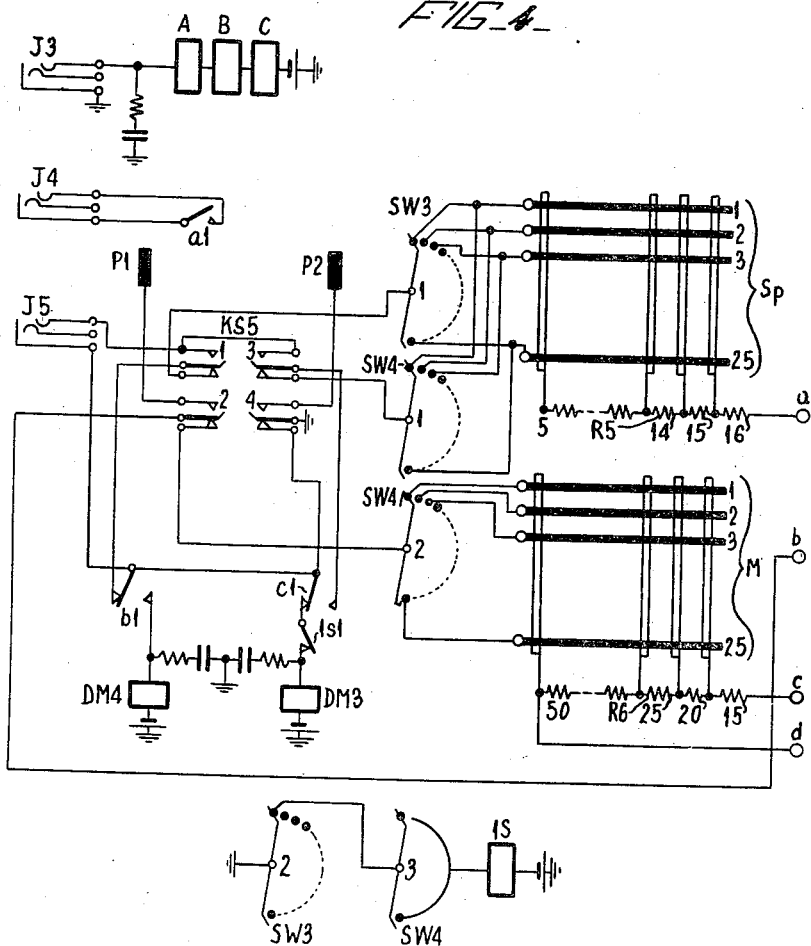

2,207,513

UNITED STATES PATENT OFFICE 2,207,513

ELECTRICAL TESTING APPARATUS

Bertram Morton Hadfield, London, England, assignor to Associated Electric Laboratories, Inc., Chicago, Ill., a corporation of Delaware Application August 29, 1938, Serial No. 227,443
In Great Britain September 6, 1937

9 Claims. (Cl. 179—175.2)

The present invention relates to electrical testing apparatus and is more particularly concerned with apparatus for testing the behaviour of an impulsing contact and for determining whether the operation of the contact is within certain specified limits.

The behaviour of an impulsing contact such as the contact of an impulse relay, a dial switch or a regenerative repeater and having particular application in automatic telephone systems, is determined by two factors, one the speed of operation, that is to say the number of impulses delivered by the contact per second and second the ratio of make to break periods of the contact expressed as a percentage, that is the "make percentage" (or "break percentage") of the contact.

It has been shown that these two factors can be illustrated graphically by plotting the make and break periods usually in milliseconds, as abscissae and ordinates to logarithmic scales so that the make and break periods are represented by a single point while if points representing the make and break periods for a given cyclic time are joined, a curve is obtained which represents a definite speed of operation of the contact. Further if points having the same make percentage are joined a series of parallel lines representing definite make percentages are obtained.

Thus for example in the case of a dial switch employed for transmitting impulses in an automatic telephone system, the normal speed of impulse transmission is 10 per second and the make percentage is 33⅓% that is a make period of 33⅓ milliseconds and a break period of 66⅔ milliseconds. In operation however it has been found that the impulsing speed may vary between the limits of 7 to 14 impulses per second while the make percentage may vary from 30 to 37%. The limits within which the dial switch operates are thus defined graphically by the area which is enclosed by the boundary lines given by the limits mentioned above. This area between the boundary lines is known as the "target diagram" for the contact.

If now the target diagram for the responding apparatus is obtained under speed and make percentage conditions which just cause the apparatus to refuse to function reliably (break down diagram), then for the dial switch to operate the responding apparatus reliably its target diagram must lie within the break down diagram of the responding apparatus with a reasonable factor of safety at all points. Since the make and break period scales are logarithmic the distances between these targets enable a ready appreciation to be obtained of the factor of safety with various combinations of speeds and make percentages.

Normally the derivation of complete break down diagrams is a laborious process, involving the averaging of the effect of a number of similar impulses of the same speed and make percentage, and it is one of the objects of the present invention to enable target diagrams to be traced out in a short period of time.

According to one feature of the invention, therefore, a cathode ray tube is employed as the indicating means and the contact under test is caused to produce on the screen of the tube for each impulse a point of which the abscissae and ordinate are respectively substantially proportional to the logarithm of the make and break periods of the contact.

It is known that if a condenser is charged by a battery over a resistance, the charging voltage curve with time very closely approximates to a logarithmic law over a wide range of time and voltages.

According to a further feature of the invention therefore a condenser is charged from a constant voltage source over a constant resistance during the make period and a second condenser is charged during the break period, the charges acquired by the condensers being applied to the abscissae or X plates and ordinates or Y plates respectively of the cathode ray tube. The deflection of the beam will thus produce a spot which forms one point on the target diagram.

The two condensers are charged successively but preferably their charges are applied to the plates of the tube simultaneously. In order to enable this method of operation to be effected and in order to allow for the dissipation of the charges on the condensers, according to a further feature of the invention, a plurality of pairs of condensers are employed and the appropriate condensers are connected up by means of stepping switches which are operated under the control of the contact under test. The bank contacts of the switches are so connected that the process of charging the condensers, applying the charges to the deflecting plates of the tube and dissipation of the charges is effected continuously.

It will be understood that the spots obtained on the tube screen for a series of impulses from the contact under test may be photographed and in this case it is useful to compare the result with either a standard target diagram or a break down diagram for instance by making the comparison diagram in the form of a transparency which may be positioned between the camera and the tube screen. Such a comparion diagram may be made by photographing the spots obtained as a result of a series of impulses which are generated in a particular manner.

For instance a given sequence of impulses may be obtained by causing a contact to rotate at a carefully controlled speed over mutually insulated metallic segments arranged in a circle and having lengths representing certain specified speeds and make percentages. Such an impulse generator would however involve precise control of speed of rotation and a high degree of mechanical precision in assembly.

It is a further object of the invention therefore to provide an impulse generator which provides impulses of varying speed and make percentages in a simple but accurate manner. While such an impulse generator has particular application to the generation of target diagram it will be understood that it is capable of other uses.

According to this feature of the invention a time base circuit is employed and the voltage wave obtained from this circuit is applied to a second circuit having a trigger operation, said second circuit including a responding device which operates to close and open a contact as determined by the electrical characteristics of the two circuits.

It should be explained in connection with the use of the expression "time base circuit" that this is a circuit similar in its method of operation to that of the well known time base circuit for applying saw-tooth or like voltages to one or both deflecting plates of a cathode ray tube, and where the expression "time base circuit" is employed in the following description such a circuit is to be understood.

Preferably the time base circuit employed uses a condenser which is charged from a constant source over a resistance to a given potential and then discharges very rapidly to a lower potential through a gas discharge valve. In order to be able to calculate the variations of resistance for given speeds, the discharge time constant must be negligible compared to the charge time constant. It is for this reason that a gas discharge valve is preferred to the well known hard valve circuits. By varying the resistance therefore the rate of charging and hence the length of the impulse may be varied. Further by varying the trigger point of the second circuit or by varying the input the make percentage of the impulse may be altered. Preferably the trigger point is varied by varying the cathode bias on a thermionic valve in the second circuit by varying the cathode tapping point on a potentiometer connected across the supply voltage or the input may be varied by altering the grid tapping on the input resistance.

It will, however, be understood that the condensers may be charged rapidly through the valve and discharged slowly through a resistance in which case it is the discharge time which is varied by varying the resistance.

According to a further feature of the invention where the variations in speed and make percentage are to be cyclic, a plurality of resistances are connected to the banks of two stepping switches, one of which controls the variation in speed and the other controls the variation in make percentage (by forming a portion of a potentiometer), the switches being stepped continuously.

It will be understood that in order to enable this arrangement to be flexible, it should be possible to alter the resistance connected to any bank contact of a switch in a simple manner and according to this feature of the invention two series of conductors are provided all mutually insulated from one another, the conductors of one series being connected to the bank contacts and the conductors of the second series being connected to the resistances, the arrangement being such that any conductor of one set is capable of being connected to any conductor of the other set.

The invention will be better understood from the following description of one embodiment taken in conjunction with the accompanying drawings comprising Figs. 1 to 6. In the drawings Fig. 1 shows the circuit arrangement for controlling the cathode ray tube in order to give the target diagram of a contact under test and which will be referred to as the target diagram delineator, Fig. 2 shows an impulse generating circuit consisting of a time base circuit and a second circuit having a trigger effect, Fig. 3 shows an alternative form of the second circuit, Fig. 4 shows the arrangement of the two stepping switches for controlling the variations in speed and make percentage of the generated impulses, Fig. 5 shows the constructional arrangement of the two series of conductors connected respectively to the switch banks and the resistances and Fig. 6 shows a testing or calibrating circuit for the apparatus.

Referring now to Fig. 1 which shows the circuit arrangement of the target diagram delineator, the contact which is to be tested is connected to the apparatus by the insertion of a plug in the jack JI. The closing of the contact causes relays IX and IY to energise in series and the opening of the contact causes their release. When relays IX and IY energise, the following charging circuit is completed for condenser $Cx1$ assuming the switches to be in the position shown: earth, springs 4 of key KSI, make contact $|x|$, springs I of key KSI, resistance $Rx$, wiper I of switch SWI, condenser $Cx1$, battery E to earth. In addition break contact $|x|$ opens the circuit for the magnet DM2 of the switch SW2 to cause it to step to contact 2 and make contact $|y|$ closes the circuit of magnet DMI to energise the switch SWI. Since the switches operate on the reverse drive principle, the wipers of switch SWI are not rotated at this time. Charging current flows over the above circuit until the contact under test opens when relays IX and IY release. The charging circuit is then opened at make contact $|x|$ and in addition at break contact $|x|$ the circuit for the magnet DM2 is closed, and at make contact $|y|$ the circuit for magnet DMI of switch SWI is opened so that the switch steps to contact 2. Condenser $Cy2$ is now charged over the following circuit: earth, springs 4 of key KSI, break contact $|y|$, springs 3 of key KSI, resistance $Ry$, wiper I of switch SW2, condenser $Cy2$, battery E to earth. The above cycle of operations continues and the condensers are charged to an extent very closely corresponding to the logarithm of the make and break periods of the contact under test up to a ratio of make to break of 3.7 to 1. Such a ratio corresponds to charge voltages of from 0.35 to 0.8 times the charging battery voltage. Ratios of up to 10:1 can however be employed without serious detriment to the target diagram.

It will be appreciated from the above description that the condensers are charged successively, the order being $Cx1$, $Cy2$, $Cx2$, $Cy3$ and so on. However, the position taken up by the beam of the cathode ray tube is determined by the charges on the condensers taken in pairs. Hence it is desirable, in order that the beam should move from one position to another in a straight line, to apply the voltage from each pair of condensers simultaneously on to the deflecting plates X and Y of the cathode ray tube. The application of the condenser voltages to the plates is effected over wipers 3 and 4 of the switch SW2 but discharging does not occur until the switch has stepped to the third contact in order to allow time for the correct charges to be registered. This may also be effected by delaying the application of the first part of the cycle by means of a relay controlled by the movement of switch SW2 on to its appropriate contact. Finally the charges on the condensers are dissipated over wipers 2 of switches SW1 and SW2 over small resistances $r1$ and $r2$ on the fourth step of the switches. The complete cycle of charge, application and dissipation is thus effected in four steps of the two switches and hence four pairs of condensers only are necessary. Five pairs are however employed as being a convenient submultiple of the total number (25) of bank contacts of the common type of uniselector switches and the condensers associated with each switch are multipled in the bank associated with wiper 1 so that with double ended wipers continuous operation is possible.

It will be understood that since break occurs before make the charge on condenser $Cx1$ is paired with the full charge on $Cy1$ which is charged before the apparatus is set in operation. Hence the applications of potential to the deflecting plates to give true test deflections of the spot are derived from condensers $Cx2$, $Cy2$; $Cx3$, $Cy3$ and so on.

It will be understood that while the switches are stepping from one contact to another, the charges on the condensers are temporarily isolated from the deflecting plates thereby causing momentary flickers of the spot. To avoid this small condensers may if desired be connected between the X and Y plates and the gun which owing to the high impedance of the X and Y plates hold the spot in position during this relatively short transit time.

It is obviously necessary for the switches SW1 and SW2 to maintain the required relationship during operation and it is sufficient if SW1 at the commencement of impulsing is on contact 1 and SW2 is on contact 6 since contacts 1 to 5 are multipled to the remaining contacts associated with wiper 1. It can be, however, determined whether the two switches are in step by closing the non-locking key KS3 when if the two switches are out of step relay S operates when switch SW2 is set on its first contact over the following circuit: earth, key KS3, wiper 5 of switch SW2 on the contact which corresponds to the first bank contact, wiper 3 of switch SW1, bank multipling, winding of relay S to battery. Relay S at contact $s1$ opens the circuit of magnet DM2 so that the switch SW2 is held stationary while switch SW1 continues to step until wiper 3 reaches a contact which is not multipled whereupon relay S releases and the two switches then operate together. If on the closure of key KS3, the two switches are in step, no circuit will be closed for relay S since when wiper 5 of switch SW2 is on contact 1, wiper 3 of switch SW1 will be on a disconnected contact.

It is to be understood that relays IX and IY are of the high speed type and are adjusted when the apparatus is installed so that the period of the operation of make contact $1x1$ and of break contact $1y1$ represent without distortion the make and break periods respectively of the contact under test. The adjustment of the relays is facilitated by inserting a test meter in the jack J2 and throwing the key KS1. It is unnecessary for the contacts to operate in synchronism and it is found that if the make contact $1x1$ is made distortionless, that is to say equal operate and release times, the break contact $1y1$ can be adjusted to give (100—make period of $1x1$)% by variation of the parallel shunt resistance R3 around relay IY, the resistance being made noneffective on the back E. M. F. by a series rectifier MR.

Preferably a cathode ray tube having a screen material of long fluorescent after-glow is employed so that a series of spots whether of cyclic or non-cyclic character can be visually observed. The display of spots can also be photographed provided the exposure is made to the actual spots and not to their fluorescence. Also by causing the back of the screen material to be uniformly illuminated and placing a transparency on which is drawn a specimen target diagram, in front of and close to the screen, the spots may be photographed as black dots superposed on a grey background with the target diagram appearing as white lines, thus providing a permanent and comparative record.

It will be understood that the particular target diagram mentioned previously obviously centres about a point represented by the nominal speed and percentage of the type of repeating system used. In the case of a dial switch as employed in certain automatic telephone systems this point is defined by an impulsing speed of 10 per second with a 33⅓% make period, but the apparatus can be modified to suit any given nominal point. Whatever the nominal point obtaining for any impulsing system, it will obviously be desirable to have such a point at the centre of the target diagram, and if the latter is in the form of a transparency applied to the screen of the cathode ray tube it is desirable to make the undeflected position of the spot coincide with this point. This can be done either by displacement of the transparency or of the spot.

The shifting of the spot is effected by throwing the key KS4 and altering the bias applied to the X and Y plate of the tube over the potentiometers Xs and Ys respectively.

The target diagram transparency can be drawn from the charging curve of a condenser plotted to a logarithmic axis for time with this nominal point corresponding to the centre point of the portion of the curve which is closely linear. It is found that this point occurs at 0.575 of the voltage of the charging battery. Hence it will be seen that when the nominal speed and make and break percentages are deflecting the spot, the nett deflection voltages on the X and Y axes of the tube should be zero. In order to effect this, the gun is biassed by 0.575 of the charge voltage with respect to the condenser charges by taking a tapping to the gun G from a resistance R4 shunted across the battery E, and then the time constants of the make and break charging circuits are altered until the spot remains at the undeflected position. There is thus no need to measure the time constants.

In order that any other speed and percentage shall cause the spot to asume the correct position, first, the axes of the tube deflections and the target diagram must be parallel, and secondly the sensitivity of the tube and the charging voltage must be correctly correlated. The latter can be effected by applying pulses of known speed and percentage and altering either the charge voltage, or the sensitivity of the tube. The latter can be performed by the high resistance potentiometers Xp and Yp feeding the X and Y plates, or by altering the gun voltage of the tube.

Where a common charge battery is used for both deflections and the nominal point deflection voltages are equal, inequalities of deflection sensitivities as between X and Y plates must be first compensated by relative adjustment of the input potentiometers to the plates. A preferred method of achieving this is shown in Fig. 1 when upon throwing the key KS2 in the upward direction a 50 cycle voltage is applied between gun and the Y plate for setting up the axes of the tube and the transparency, while on throwing the key in the downward direction the voltage is applied between gun and X and Y plates simultaneously when a diagonal line at 45° should be obtained when the input sensitivities of both axes are the same.

The source of charging voltage E can be a battery or it is possible to use a portion of the rectified voltage which energises the cathode ray tube. Provided this voltage is shunted by a suitable low impedance gas discharge valve, such as a neon tube, the charging of the condensers and the deflections will be unaffected.

The time constants of all the X condensers with the resistance Rx must of course be equal and this can be effected either by selecting and matching the condensers, or alternatively by inserting small semi-variable resistors in each condenser lead and so effecting the adjustment individually. The same applies of course to the Y condensers and resistance Ry.

If a hard cathode ray tube is used the potentiometers Xs and Ys for providing the shifting biasses can be removed from the deflecting plates X and Y, and replaced by potentiometers across the charging battery E supplying the remaining X and Y plates. This is not possible with a gas-filled tube in which the remaining plates are split and used for origin distortion correction in the well known manner.

In applying the condenser charges to the plates over potentiometers, the time constants of the latter with the condensers must be high enough to prevent movement of the spot at low impulsing speeds. It is found that capacities of 1 microfarad and potentiometers of some 5 megohms are satisfactory, giving charge resistances of some 50,000 to 100,000 ohms.

It is possible to render the deflections independent of main voltage variations when both the charge voltage and tube voltage are proportional to the supply voltage, since the sensitivity of the tube is inversely proportional to the tube voltage. In this case, however, the impedance of the charge voltage source must be very low in order not to affect the charging and deflection, and it is preferred to render both tube and charge voltages independent of supply voltage variations by well known means such as neon tube stabilisers.

It will be apparent that this apparatus is independent of any calibrating source once it has been set up and can be used with differing transparencies having the same nominal centre in terms of speed and percentage by altering the charge voltage or sensitivity of the tube as mentioned above. It can be used therefore, for depicting the performance of any impulsing contact whether of cyclic or noncyclic character, such as dial or regenerator impulses.

When testing irregular groups of pulses from say a dial, it is advantageous to be able to depict only the spots resulting from these pulses as a group. This may be achieved by a subsidiary relay operated from the pulses which energises a slow releasing relay, the contacts of which cause the spot to be visible. The latter may be effected either by closing the gun circuit of the tube or by shorting a high resistance connected in the cathode lead.

By arranging the slow release relay to be operated on the make contact of the subsidiary relay, for pulses from a make contact, or on the break contact for pulses on a break contact by means of a key, any type of contact can be thus tested.

Similarly, if it is desired to test a contact giving reversed dialling pulses (i. e. 67% make) or the like, the insertion of a high speed distortionless relay with small transit time, between the input jack JI and the relays IY and IX, will allow of this by using the break contact instead of the make by means of another key. Such a relay can be made with advantage to have a high resistance and sensitivity (such as a polarised telegraph relay) and will therefore enable contacts at a distance from the delineator to be tested without introducing excessive distortion due to the impedance of the connecting leads.

By using means for detecting the position of the cathode ray spot such as conducting insets in the screen material, or photoelectric cells any given target area can be defined and an indication given when the apparatus under test deviates outside this area. It is therefore possible to use the apparatus as a routiner, provided the apparatus under test is energised over its working limits.

The impulse generator together with the associated control and test circuits is shown in Figs. 2, 4 and 5. The impulses are generated by the circuit shown in Fig. 2 under the control as regards speed and make percentage of the circuits shown in Fig. 4, connections extending for this purpose between terminals a, b, c and d of Fig. 4 and Ia, Ib, Ic, Id of Fig. 2 respectively.

The general principle of operation of the impulse generator is as follows. A saw-toothed voltage wave is generated by a circuit similar to that known as a "time base circuit" for a cathode ray tube. This voltage wave is then applied to a trigger circuit to cause the operation of a relay when the circuit triggers. The time base condenser is charged over a resistance and by making the resistance variable the time of charging the condenser and hence the duration of the impulse i. e. impulsing speed is variable.

The second stage in the generator, consisting of a valve or valves and relay, provides impulses on the relay contact of varying make percentages —the speed of the pulses being dependently determined by the previous time base stage. In order to be able to vary the proportion of the cyclic time for closure of the relay contacts (i. e.

make percentage) this stage must have an effective trigger action at some grid voltage, so that by varying the trigger characteristic, the period of operation of the relay per cycle can be altered.

One method of varying the make percentage is to cause the applied amplitude to alter, by providing tappings on the input resistance which is fed with the exponential cyclic voltages from the time base stage via a condenser. The tapped proportion of the input voltage, which is alternating in character, is then applied to a valve stage which is biassed so that the relay is normally unoperated. Then when the input voltage rises positively on the grid, the relay will operate when the anode current has risen to a value such as to operate the relay. Alteration of the magnitude of the input voltage can be effected by altering the tapping and so altering the relay contact make percentage. As the input is alternating in character however, it is impossible to attain more than 50% make percentage, and to exceed this value the input can be converted into positive voltage variations either by feeding a D. C. voltage to the grid coupling resistance over arother high resistance from the positive battery terminal, its value being equal to half the total variation of voltage, or by shunting the resistance with a diode valve so that a bias of this valve is automatically produced. A circuit of the latter type is illustrated in Fig. 3 where condenser C3, resistance R11 plus external resistances connected between terminals 2c and 2d constitutes the coupling to valve V3. Across these resistances a diode valve V4 is connected, so as to produce a positive bias and enable percentages greater than 50 to be obtained. In any case, the variation of make percentage with tapping point is not linear (assuming the rise of anode current to be approximately linear), although it can be calculated, and also a series of taps so as to provide given percentages.

An alternative method of varying the make percentage, is to leave the input voltage variations at constant amplitude, whether alternating or unidirectional, and to alter the bias on the second valve stage. Assuming, as before, that the input to the relay is linear with time, it can be shown that this method gives linear changes in bias for changes in make percentage and is therefore preferable. Furthermore the conversion of the input to unidirectional changes is not now essential to attain high percentages, since the bias can be varied positively, as well as negatively about the operate point of the relay. A further advantage is that a series of low resistance bias voltage taps can be arranged as opposed to high resistance input taps, with consequently less likelihood to pick-up of interference from nearby switchgear.

It will be seen that both the above methods rely on the existence and maintenance of an effective "trigger" or working point—namely the operate current of the relay in relation to the valve characteristics. It has been found that such a trigger point is not precise enough to give the extremely consistent performance required or to give constant make percentage with speed variations which is postulated by the theoretical action. This is due to variations in the operate current and operate lag of the relay. Hence it is found preferable to make the second stage have an electrical trigger action, as opposed to the electromechanical action of the circuit shown in Fig. 3, so that the relay operating current is of the square topped variety. In this manner an adequate current factor of safety can be given to the relay and small variations in its operate current produce negligible effect. For the same reason the operate lag is rendered constant and the relay can be made distortionless by equating the operate lag to the release lag in any well known manner. Hence the make percentage can be made constant, at any given setting, with variations in speed. Such a circuit arrangement is shown in Fig. 2.

Referring now to Fig. 2, the condenser C1 is charged over a resistance connected to terminal 1a and the value of which may be varied in a manner to be described later. As the condenser C1 is charged, the anode potential of the valve V1, which is of the gas discharge type, is increased until at a value determined by the setting of the grid bias potentiometer Q, the valve discharges the condenser very rapidly until the voltage on the anode reaches the extinguishing voltage. The waveform applied to the valve V2 as a result of the charging and discharging of the condenser C1 is substantially saw-toothed and is composed of the well-known curve for charging a condenser over a resistance followed by a very rapid dissipation of the charge. This alternating waveform is applied to the grid of the pentode valve V2 over a condenser C2 and resistance R1. The valve V2 is arranged to operate on the trigger principle at some definite grid voltage by means of suitable cathode biassing and the output is then passed through the D. C. valve stages V5 and V6, a relay G being located in the anode circuit of the last valve. The operation of the D. C. stages forms the subject matter of my co-pending application Ser. No. 238,707, filed Nov. 3, 1938. The operation of relay G causes at its contacts the generation of one impulse for each charging and discharging operation of the condenser C1.

While the valve V2 is preferably of the pentode type, it is to be understood that other types of valve may be satisfactorily employed. Further a resistance of about 0.5 megohm may be inserted in the grid lead of this valve in order to prevent excessive grid current loading over the resistance R1 and any high frequency pick-up from nearby apparatus may be by-passed by a small condenser connected between grid and cathode.

It will be seen that the speed of impulsing is determined by the value of the resistance in the charging circuit of the condenser C1 and hence different impulsing speeds may be obtained by varying this resistance. This variation of speed does not however have any effect on the make percentage since this is dependent only on the amplitude of voltage variations applied to the valve V2 which is determined by the cathode bias on V2.

The arrangement for controlling the speed of impulsing and make percentage and for enabling the relay G to deliver a series of impulses of differing speeds and/or make percentage in any given cyclic formation is shown in Fig. 4. The circuit includes two automatic switches SW3 and SW4 of the well-known uniselector type the bank contacts of which are connected to a series of horizontal bars arranged in conjunction with a series of vertical bars as shown in detail in Fig. 5. A plate P1 of insulating material has the vertical bars VB inset on one side and the horizontal bars HB inset on the other side. Holes H are drilled and tapped through the horizontal and vertical bars and the plate at the intersection of the bars so that by the insertion of screws S the horizontal and vertical bars may be connected together. Twenty-five horizontal bars are provided for connection to the 25 contacts in banks 1 of the switches SW3 and SW4 and a further 25 are provided for connection to the 25 contacts in bank 2 of switch SW4. The 25 vertical bars associated with the first mentioned horizontal bars are connected to tapping points on a resistance R5 which is connected to terminal a. The 25 vertical bars associated with the second mentioned horizontal bars are connected to tapping points on a resistance R6 one end of which is connected to terminal c and the other to terminal d.

In operation 25 screws are inserted at the intersections of each of the groups of bars in dependence upon the impulsing speeds and make percentages desired and with the switches in the position shown, a charging circuit for the condenser C1 is closed as follows: earth, springs 4 of key KS5 in their rest position, contact b1, springs 1 of key KS5 in their rest position, wiper 1 and bank contact 1 of switch SW3, horizontal bar Sp1, vertical bar with which horizontal bar 1 is connected, tapping on resistance R5, terminal a, terminal 1a (Fig. 2), condenser C1, battery to earth. The condenser C1 thereupon commences to charge and the time of charging is dependent upon the resistance in the circuit and hence on which of the vertical bars is connected to the horizontal bar Sp1. In a similar manner the make percentage is determined by the connection between the horizontal bar M1 and vertical bar to give a variable tapping on resistance R6 and hence varying the bias on the valve V2 (Fig. 2).

No further operation takes place until relay G operates and contact g1 closes. This contact is connected over jack J6 and a double ended plug to jack J3 (Fig. 4) and hence the closing of the contact causes the operation of relays A, B and C which are of the high speed type. The generated impulses are made available at contact a1 over jack J4, relay A being adjusted to repeat the impulses without distortion. Relays B and C are synchronized as regards the break contact of relay B and the make contact of relay C and hence on their operation cause the immediate transference of the charging circuit for condenser C1 from wiper 1 of switch SW3 to wiper 1 of switch SW4, and in addition the wipers of switch SW3 are stepped on to the second contact after a period dependent on the operate lag. Continuity of the given charging speed is thus maintained by the transference of the charging circuit until the termination of the pulse by the discharge of the condenser by the valve V1. It is to be noted that it is not necessary to perform this switching function in the case of the make percentages resistances connected to bars M1—M25 since having determined the make percentage, the subsequent action will depend on the time base. It is preferable, however, to make wiper 2 of switch SW4 of the bridging type in order to avoid discontinuity in the grid/cathode circuit of the valve V2 while the switch is stepping. When the pulse is terminated relays B and C release, the charging circuit is transferred back to wiper 1 of switch SW3 now on contact 2 and switch SW4 is stepped on to its second contact. In this position the charging resistance may have a different value and so may the cathode bias on the valve V2 depending on the method of connection of the bars so that the next impulse generated will have a different speed and a different make percentage.

Since the variation of speed and make percentage which can be obtained with the above apparatus are independent, the apparatus can be employed for tracing out a standard target diagram having any desired limits of speed and percentage. For this purpose contact a1 is connected to jack J1 (Fig. 1) by means of a double-ended plug when the target diagram will be traced in the manner described above in connection with the delineator.

It will be observed that for the duration of the release lags of relays G, B and C, a period exists after the discharge of the time base when the next charge is proceeding at the old speed. This could be ameliorated by causing the synchronised relays to release by means of a relay dependent in operation on the discharge of the time base itself but would add a complication to the circuit which is hardly justifiable. It has been found that if the speed steps from one pulse to the next are not more than 2 i. p. s. the resulting distortion in terms of speed and percentage is less than 0.5%. It will be understood that the release and stepping of switch SW4 will delay the application of cathode bias to the valve V2. This however is not noticeable until the make percentage approaches 100%.

Relays B and C are synchronised by adjustment of the residual air gaps and contact travel. Synchronism may be tested by the insertion in plug J5 of a suitable percentage testing meter and the operation of key KS5 when 100% deflection indicates effective synchronisation.

With regard to the variations in speed and make percentages, the tappings on the resistance R5 are so arranged in the present embodiment as to give a variation in impulsing speed from 5 to 16 impulses a second while the tappings on resistance R6 are arranged to give make percentages of 15, 20, 25, 30, 33⅓, 36⅔, 40, 45 and 50.

It will also be seen that if the switches get out of step, relay 1S will operate when wiper 2 of switch SW3 is on contact 1. Relay 1S has the same function as relay S in Fig. 1 but in this case the switch SW4 is rotated until it is on the same contact as switch SW3.

It is possible to use a circuit having only one uni-selector and/or a simple changeover contact for maintaining continuity of charging speed, but apart from the timing difficulties inherent in the stepping of the switch, a cap in the charge period will occur due to the transit of the contact and this can give serious distortion of speed and percentage, even when the speeds are as close as 1 i. p. s.

It will therefore be seen that any cyclic system of pulsing having 25 pulses per cycle can be generated by connecting together the appropriate horizontal and vertical bars. Thus in the case where a dial switch is to be tested, the generator may be arranged to provide a complete cycle of pulses corresponding to successive target points on the operational limits of the dial switch. For example, commencing at target points such as 7 impulses per second, 37% make, it will be obvious that if two or more pulses of the same speed but of varying make percentages of 33 and 30 are plotted, then the upper side of a dial target will be generated at three points. Similarly by then keeping the make percentage constant at 30 and altering the speed in steps of one impulse per second to 14 impulses per second another side will be generated. Proceeding in this manner a closed loop defined by these points in say eighteen successive pulses may be traced in as little as approximately 2 seconds. Similarly any part of a target area can be generated or any contact position can be assigned to any other function such as the production of discontinuous cycles of target pulses. The latter principle can be used for successively applying the same target pulses to successive pieces of automatic repeating apparatus, by delaying the transmission of the next series of pulses until the new test apparatus and the measuring apparatus are joined up.

Alternatively, the connection systems of any required target area or areas can be assigned to multiple bank uni-selectors so that by stepping the latter forward, apparatus requiring different break down limits can be readily tested on an automatic routiner basis.

The generator may also be used as a source of continuous impulsing for switchgear in automatic exchanges by employing a number of subsidiary relays each corrected for equality of operate and release lags, with the advantage of consistency and rapid alteration of speed and percentage, if required.

It will be understood that while the change of speed and make percentage has been shown controlled by the arrangement of Fig. 4, it is not essential to employ such an arrangement. The speed may be varied by connecting a variable resistance between terminal 1a and the earthed battery terminal, without affecting the make percentage, since the latter is dependent only on the amplitude of voltage variation on valve V1 and condenser C. This amplitude is, or can be made, independent of the charging resistance which according to the inverse resistance law (i. e. period of time base $$\alpha \frac{1}{CR}$$

where C is constant and the discharge time is negligible) determines the speed of operation. Alternatively if the conductance of the charging resistance is altered in uniform steps the speed will also alter uniformly.

The make percentage may also be altered by connecting a potentiometer between terminals 1c, 1d or 2c, 2d, and taking 1b and 2b to the sliding arm. In Fig. 2 the upper limit can then be determined by R10 and the lower by R9 (in terms of make percentage on contact g1), and then the intermediate changes will be approximately linear depending on the closeness to linearity of the charge waveform on C1, whilst in Fig. 3 the upper limit can be determined by R11 and the changes will not be linear.

In setting up the apparatus it is only necessary to measure the speed at one setting, when the others will follow by the inverse resistance law, and also the percentage at the two extremes represented by terminals c and d. For this purpose two plugs P1 and P2 are provided, P2 for insertion at any given tapping point on resistance R5, and P1 at any given tapping point on resistance R6, and on operating key KS5, continuous impulsing of relays G and A, and, of course, B and C will result. Inserting a suitable meter circuit at J2 or J4 the speed is adjusted by the bias on V1, and the percentage limits (50% and 15% in this case) adjusted in turn by R10 and R9 respectively.

A suitable meter circuit for such testing is shown in Fig. 6. Key KS6 is operated downwards to the BK position and the potentiometer V adjusted to give 100% reading on the meter M and the contact to be tested is inserted at J7. Operating key KS6 to MK and BK will then give the percentages on the make and break contacts of a changeover spring set provided the make contact is connected to the tip, the break to the ring and the changeover to the sleeve conductors in the well known manner if M is a moving coil meter, whilst operating key KS7 will energise relay T and at t1 the condenser charge on C4 will be dissipated in the meter giving the speed of operation of the contact. A relief relay T is used so that the speeds of either single make or break contacts can be measured. The battery supply is between earth and terminal X. The 100% adjustment is arranged so as to self calibrate both speed and percentage tests, by adjusting R12 to give 100% deflection when the tapping on V is such as to give the correct speed deflection from a contact operating at a known speed. The exact value of the condenser is thus immaterial. The discharge current of C4 is used in preference to the charge as the latter may be affected by the inherent resistance of the voltage source, whilst resistance R13 is of value such as to limit the charge and discharge currents. The time constant of C4 and R13 is kept low enough to ensure that C4 is fully charged and discharged at the highest practical testing speed.

As regards stability of performance with battery voltage changes, changes in heater emission are prevented by the use of a barretter, and the voltage across some of the heaters is used to operate the meter testing circuit in Fig. 6 between earth and terminal X. Changes in anode voltages are compensated for on the basis that all the valve characteristics show linearity with grid bias voltages over the working range with an interception on the grid bias axis. The grid bias potentials are therefore derived from two sources, one constant and the other proportional to the anode voltage change (the constant portion being derived from the heater circuits). In this manner it is possible substantially to ameliorate changes in performance with supply voltage variations.

I claim:

1. An arrangement for measuring the percentage of make and break periods of an impulsing contact, comprising a cathode ray tube, means for generating voltages proportional to the make and break period of said contact, means for applying said voltages to said tube, said voltages causing the beam of said tube to assume a position causing a spot on the screen of the tube indicative of the percentage of said make and break periods.

2. An arrangement as claimed in claim 1 in which said voltages are simultaneously applied to said tube.

3. An arrangement for providing an indication of the make and break percentage and speed of operation of an impulsing contact comprising a cathode ray tube, a pair of condensers, means for charging said condensers to an extent determined by the make and break periods of said contact, and means for applying said charges to the deflecting plates of said tube to cause a deflection of the beam thereof representing said periods on a logarithmic scale.

4. An arrangement as claimed in claim 3, in which there are a plurality of pairs of condensers, and wherein said first means charges a condenser of one pair to an extent dependent on the make period of said contact and the other condenser to an extent determined by the break period of said contact, and in which said last means applies the voltages of said pairs to the plates of the tube.

5. An arrangement for providing a visual indication of the make and break periods and speed of an impulsing contact, comprising a plurality of pairs of condensers, a cathode ray tube, a pair of stepping switches, means for operating said switches to connect each pair of condensers to a charging circuit successively to charge one in accordance with the break period of said contact, said switches then operating to connect each pair of condensers to the plates of said tube to deflect the beam thereof in accordance with the percentage of make and break of said contact.

6. An arrangement for indicating the make and break percentage of an impulsing contact comprising a cathode ray tube, means for placing a normal bias on the deflecting plates of the tube, pairs of condensers successively charged in accordance with the time of make and break of said contact, and means for simultaneously connecting said condensers in pairs to the plates of the tube, the deflection of the beam by said condenser charges causing the spot on the screen of the tube to assume a position indicative of the make and break percentage of said contact.

7. An arrangement for providing a visual indication of the make and break percentages of an impulsing contact comprising a cathode ray tube having the usual deflecting plates and a flourescent screen, a source of potential normally connected to the plates of the tube through potentiometers to normally bias the beam thereof as desired, a pair of condensers, means for charging one of the pair in accordance with the make period and the other in accordance with the break period of said contact, and means for simultaneously applying the potential, to which said condensers have been charged, to the plates of said tube to deflect the beam thereof in accordance with the percentage of make and break periods of said contact.

8. In an arrangement for giving visual indications corresponding to the make and break percentage of an impulsing contact, a cathode ray tube, a plurality of pairs of condensers, a pair of stepping switches having wipers and banks of contacts, said condensers connected to contacts of both switches, a pair of relays operated by said impulsing contact, means controlled by said relays for alternately operating said switches one step for each impulse, one step of one switch causing one condenser of a pair to be charged an amount dependent on the make period of said impulsing contact and one step of the other switch causing the other condenser of the pair to be charged an amount dependent on the break period of said impulsing contact, another step of said last switch causing both condensers of said charged pair to be connected to the deflecting plates of said tube, the consequent deflection of the beam of said tube causing the spot on the screen thereof to assume a position indicative of the make and break percentage of said contact.

9. In an indicating arrangement, an impulsing contact, a pair of high speed relays connected in series with said contact and intermittently operated thereby, a pair of stepping switches having operating magnets, a plurality of pairs of condensers, means controlled by one relay when energized by the closing of the contact for closing a charging circuit to a condenser of a pair through the wiper of one switch, and for completing the energizing circuit of the magnet of the other switch when deenergized, means controlled by the other relay when deenergized by said contact for closing a charging circuit to the other condenser of the pair through a wiper of the other switch, and for closing a circuit for energizing the magnet of the first switch when energized by said contact, an indicator, the alternate operation of said switches successively connecting said condensers in pairs to the indicator to indicate the make and break percentage of the contact.

BERTRAM MORTON HADFIELD.